(12) United States Patent
Pickett

(10) Patent No.: US 6,957,322 B1
(45) Date of Patent: Oct. 18, 2005

(54) EFFICIENT MICROCODE ENTRY ACCESS FROM SEQUENTIALLY ADDRESSED PORTION VIA NON-SEQUENTIALLY ADDRESSED PORTION

(75) Inventor: James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 381 days.

(21) Appl. No.: 10/202,750

(22) Filed: Jul. 25, 2002

(51) Int. Cl.[7] ............................................. G06F 9/22
(52) U.S. Cl. ..................... 712/211; 711/215; 712/243; 712/245
(58) Field of Search ..................... 711/215; 712/211, 712/243, 245

(56) References Cited

U.S. PATENT DOCUMENTS

| | | | |
|---|---|---|---|
| 4,604,684 A * | 8/1986 | Epstein ...................... 712/211 |
| 4,750,108 A * | 6/1988 | Slavenburg ................ 711/217 |
| 5,032,983 A * | 7/1991 | Fu et al. .................... 711/217 |
| 5,046,040 A * | 9/1991 | Miyoshi ..................... 712/230 |
| 5,345,570 A * | 9/1994 | Azekawa ................... 712/248 |
| 5,537,629 A | 7/1996 | Brown et al. .............. 712/210 |
| 5,577,259 A * | 11/1996 | Alferness et al. ........... 712/41 |
| 5,630,083 A | 5/1997 | Carbine et al. ............ 712/212 |
| 5,689,672 A | 11/1997 | Witt et al. .................. 712/213 |
| 5,771,365 A * | 6/1998 | McMahan et al. ......... 712/205 |
| 5,845,102 A | 12/1998 | Miller et al. ............... 712/211 |

FOREIGN PATENT DOCUMENTS

EP          651 320          5/1995

OTHER PUBLICATIONS

"Pentium Processor User's Manual, vol. 3: Architecture and Programming Manual," Intel Corporation, 1993, pp. 25-1 though 25-5.

* cited by examiner

*Primary Examiner*—Kenneth S. Kim
(74) *Attorney, Agent, or Firm*—Robert C. Kowert; Meyertons, Hood, Kivlin, Kowert & Goetzel, P.C.

(57) ABSTRACT

A microcode instruction unit for a processor may include a microcode memory having entries for storing microcode instructions. A decoder for the microcode memory may decode microcode addresses to select entries of the microcode memory. A microcode entry point generator may receive complex instructions and provide a microcode entry point address to the decoder for each complex instruction. Each microcode entry point address may have a bit-width greater than needed to encode all the entries of the microcode memory. The microcode memory decoder may decode each microcode entry point address to select an entry in the microcode memory storing the beginning of a microcode routine to implement the corresponding complex instruction. The decoder may sparsely decode the microcode address range so that not all entries of said microcode memory are sequentially addressed.

21 Claims, 10 Drawing Sheets

| Prefix 0-4 bytes (Optional) | Opcode 1-2 bytes | Mod R/M 0-1 byte (optional) | SIB 0-1 byte (optional) | Displacement 0,1,2,or 4 bytes (optional) | Immediate 0,1,2, or 4 bytes (optional) |

Generic X 86 Instruction Format

FIG. 1A
(PRIOR ART)

EFFICIENT MICROCODE ENTRY ACCESS FROM SEQUENTIALLY ADDRESSED PORTION VIA NON-SEQUENTIALLY ADDRESSED PORTION

BACKGROUND OF THE INVENTION

1. Field of the Invention

This invention relates to the field of processors and, more particularly, to microcode instruction mechanisms within processors and the generation of entry points to microcode memory in processors.

2. Description of the Related Art

Superscalar processors achieve high performance by executing multiple instructions per clock cycle and by choosing the shortest possible clock cycle consistent with the design. As used herein, the term "clock cycle" refers to an interval of time accorded to various stages of an instruction processing pipeline within the processor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Less complex instructions are typically directly decoded by hardware decode units within the processor. Often, complex instructions are classified as microcoded instructions. Microcoded instructions are transmitted to a microcode instruction unit within the microprocessor, which decodes the complex microcoded instruction and produces two or more simpler microcode instructions for execution by the microprocessor. The simpler microcode instructions corresponding to the microcoded instruction are typically stored in a read-only memory (ROM) within the microcode unit. Thus, microcoded instructions are often referred to as MROM instructions. The terms "directly-decoded instruction" or "fastpath instruction" or "non-complex instruction" may be used interchangeably herein to refer to instructions which are decoded and executed by the processor without the aid of a microcode instruction unit. As opposed to MROM instructions which are reduced to simpler instructions which may be handled by the microprocessor, directly-decoded instructions are decoded and executed via hardware decode and functional units included within the microprocessor.

Instructions processed in a processor are encoded as a sequence of ones and zeros. For some processor architectures, instructions may be encoded in a fixed length, such as a certain number of bytes. For other architectures, such as the x86 architecture, the length of instructions may vary. The x86 microprocessor architecture is one example of an architecture having complex instructions that may be implemented in microcode. The x86 microprocessor architecture specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

A generic format illustrative of the x86 instruction set is shown in FIG. 1A. As illustrated in the figure, an x86 instruction may include from one to four optional prefix bytes, followed by an operation code (opcode) field, an optional addressing mode (Mod R/M) byte, an optional scale-index-base (SIB) byte, an optional displacement field, and an optional immediate data field.

The opcode field defines the basic operation for a particular instruction. The default operation of a particular opcode may be modified by one or more prefix bytes. For example, a prefix byte may be used to change the address or operand size for an instruction, to override the default segment used in memory addressing, to instruct the processor to repeat a string operation a number of times, or to specify a different basic operation. The prefix bytes may contain one or more prefix byte codes. The opcode field follows the prefix bytes, if any, and may be one or two bytes in length. The addressing mode (ModR/M) byte specifies the registers used as well as memory addressing modes. The scale-index-base (SIB) byte is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field, which may be from one to four bytes in length. The displacement field contains a constant used in address calculations. The optional immediate field, which may also be from one to four bytes in length, contains a constant used as an instruction operand.

Referring now to FIG. 1B, several different variable byte-length x86 instruction formats are shown. The shortest x86 instruction is only one byte long, and comprises a single opcode byte as shown in format (a). For certain instructions, the byte containing the opcode field also contains a register field as shown in formats (b), (c) and (e). Format (j) shows an instruction with two opcode bytes. An optional ModR/M byte follows opcode bytes in formats (d), (f), (h), and (j). Immediate data follows opcode bytes in formats (e), (g), (i), and (k), and follows a ModR/M byte in formats (f) and (h). FIG. 1C illustrates several possible addressing mode formats (a)–(h). Formats (c), (d), (e), (g), and (h) contain ModR/M bytes with offset (i.e., displacement) information. An SIB byte is used in formats (f), (g), and (h).

Certain instructions within the x86 instruction set are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation.

Different instructions may require differing numbers of microcode instructions to effectuate their corresponding functions. Additionally, the number of microcode instructions corresponding to a particular MROM instruction may vary according to the addressing mode of the instruction, the operand values, and/or the options included with the instruction. The microcode instruction unit issues the microcode instructions into the instruction processing pipeline of the microprocessor. The microcode instructions are thereafter executed in a similar fashion to other instructions. It is noted that the microcode instructions may be instructions defined within the instruction set, or may be custom instructions defined for the particular microprocessor.

A processor may decode or partially decode an instruction encoding to determine if an instruction is a fastpath instruction or an MROM instruction. If the instruction is an MROM instruction, the processor's microcode instruction unit determines an address within the processor's microcode ROM at which the microcode instructions are stored. The microcode routines to implement MROM instructions are typically stored in a sequentially addressed ROM. Typically, the microcode instruction unit maps or translates some or all of the instruction encoding to a microcode ROM address for a location the microcode ROM at which the corresponding microcode routine begins. This mapping may be performed by a lookup table, content-addressable memory, combinatorial logic, or any other mechanism for translating the MROM instruction encoding to a ROM address. For example, microcode may be stored in a 3K ROM. The microcode unit may map an MROM instruction encoding to a 12-bit ROM address in the range 0x000–0xBFF according to where the beginning of the microcode routine for that MROM instruction is located. The ROM address is sent to an address decoder for the ROM which selects the addressed ROM entry. The microcode instruction at the selected ROM entry is transferred out of the ROM to be executed. The ROM address may be incremented to the next microcode instruction in the routine. Also, some microcode instructions may indicate a jump to a non-sequential address in the microcode ROM. Multiple clock cycles may be used to transfer the entire set of instructions within the ROM that correspond to the MROM instruction.

The process of determining the address in a microcode ROM to begin execution of a microcode routine to implement an MROM instruction is referred to as microcode entry point generation. As discussed above, microcode entry point generation involves mapping an MROM instruction encoding to a microcode ROM address. At higher clock frequencies, this mapping process may be difficult to complete in one clock cycle. Thus, microcode entry point generation may introduce stalls in the processing pipeline if additional clock cycles are required to map the MROM instruction to a microcode ROM address.

SUMMARY

A microcode instruction unit for a processor may include a microcode memory or storage having a plurality of entries configured to store microcode instructions, in one embodiment. A decoder coupled to the microcode memory may be configured to decode microcode addresses to select entries of the microcode memory. A microcode entry point unit may be configured to receive complex instructions and provide a microcode entry point address to the decoder for each complex instruction. Each microcode entry point address may have a bit-width greater than needed to encode all the entries of the microcode memory so that each microcode entry point address may be provided within a microcode address range larger than the number of entries of the microcode memory.

The microcode memory decoder may be configured to decode each microcode entry point address to select an entry in the microcode memory storing the beginning of a microcode routine to implement the corresponding complex instruction. The decoder may be configured to sparsely decode the microcode address range so that not all entries of said microcode memory are sequentially addressed. The microcode memory may have a sequential and a non-sequential section, and the decoder may be configured to sequentially decode microcode addresses for the sequential section of the microcode memory and sparsely decode microcode addresses for the non-sequential section of the microcode memory.

One embodiment may include a method for efficient entry point generation for a microcode storage in a processor. Microcode instructions may be stored in a plurality of entries of a microcode storage. The microcode instructions may include routines for implementing complex processor instructions. When a complex instruction is reached in the instruction stream in a processor, an entry point address may be generated from the complex instruction. The microcode entry point addresses may be a "wide" address having more bits than needed to encode all of the microcode storage entries. For example, the microcode storage may have n entries, and the bit-width of the microcode entry point addresses may be greater than $\log_2 n$ rounded up to the next integer. In one embodiment, generating a microcode entry point address from a complex instruction may include providing portions of the complex instruction encoding as the microcode entry point address.

The microcode entry point address may be decoded to select one of the microcode storage entries storing the beginning of a microcode routine to implement the corresponding complex instruction. The entry point address may be decoded to a sparsely addressed section of the microcode memory in which not all of the entries are sequentially addressed. The located microcode routine may be executed to implement the complex instruction.

BRIEF DESCRIPTION OF THE DRAWINGS

FIG. 1A illustrates various instruction set formats for a processor;

Figure 1B:
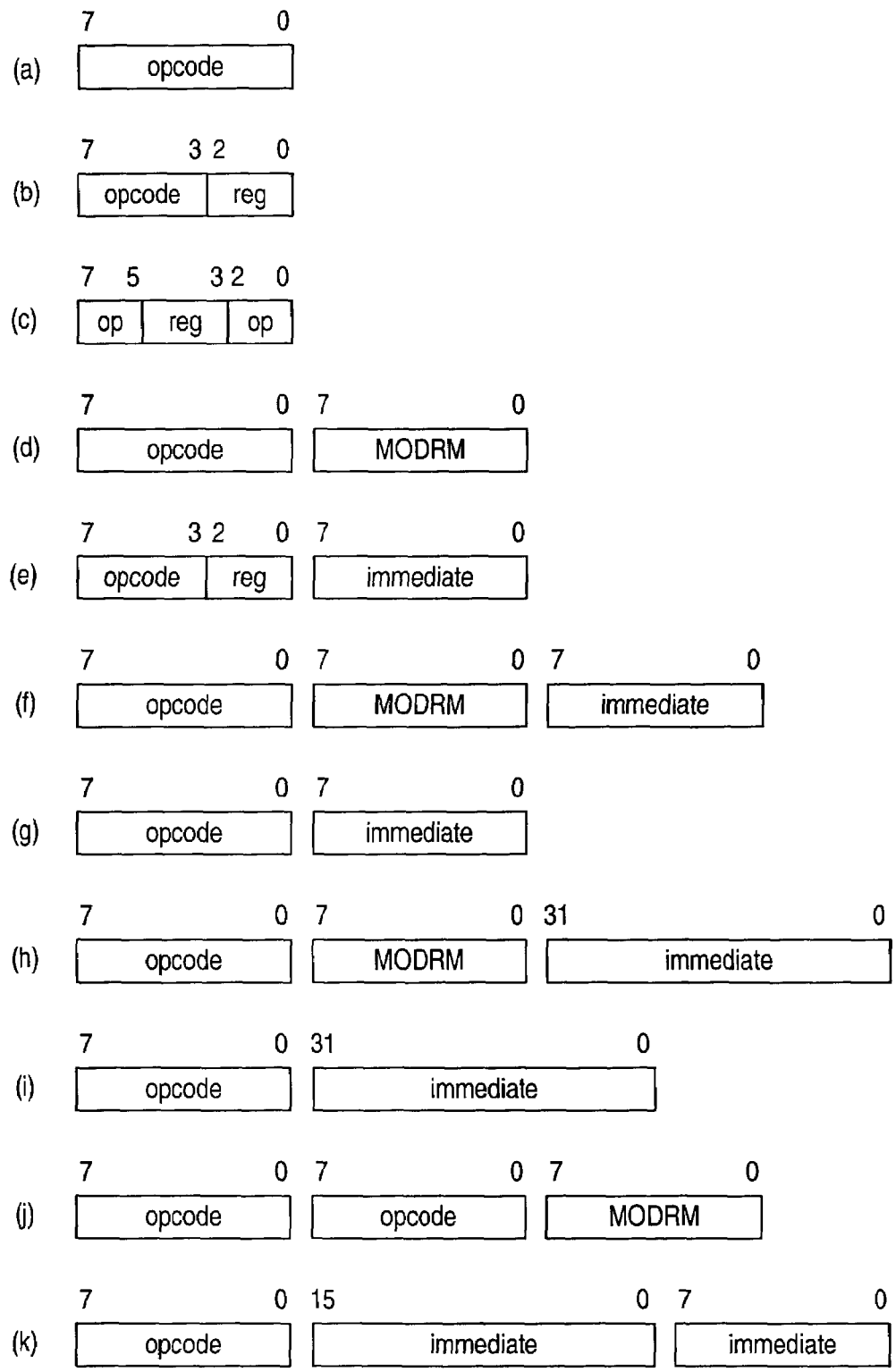
FIG. 1B illustrates variable byte-length instruction set formats for a processor.
Figure 1C:
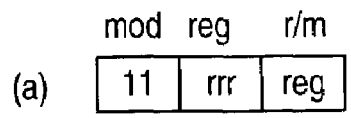
FIG. 1C illustrates various addressing mode formats for an instruction set for a processor.
Figure 1C:
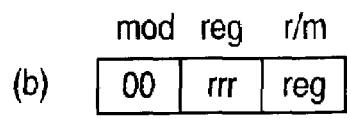
Figure 1C:
Figure 1C:
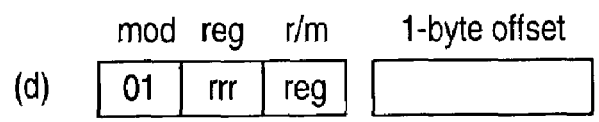
Figure 1C:
Figure 1C:
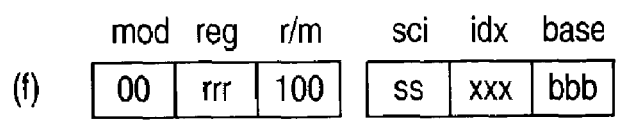
Figure 1C:
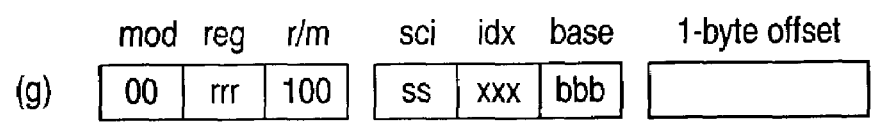
Figure 1C:
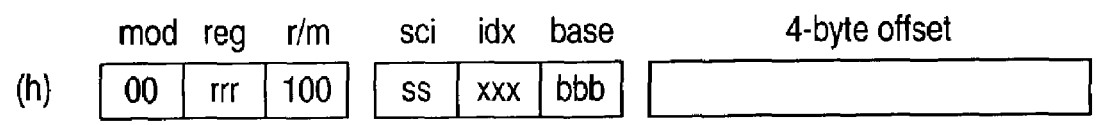

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS OF THE INVENTION

Figure 2:
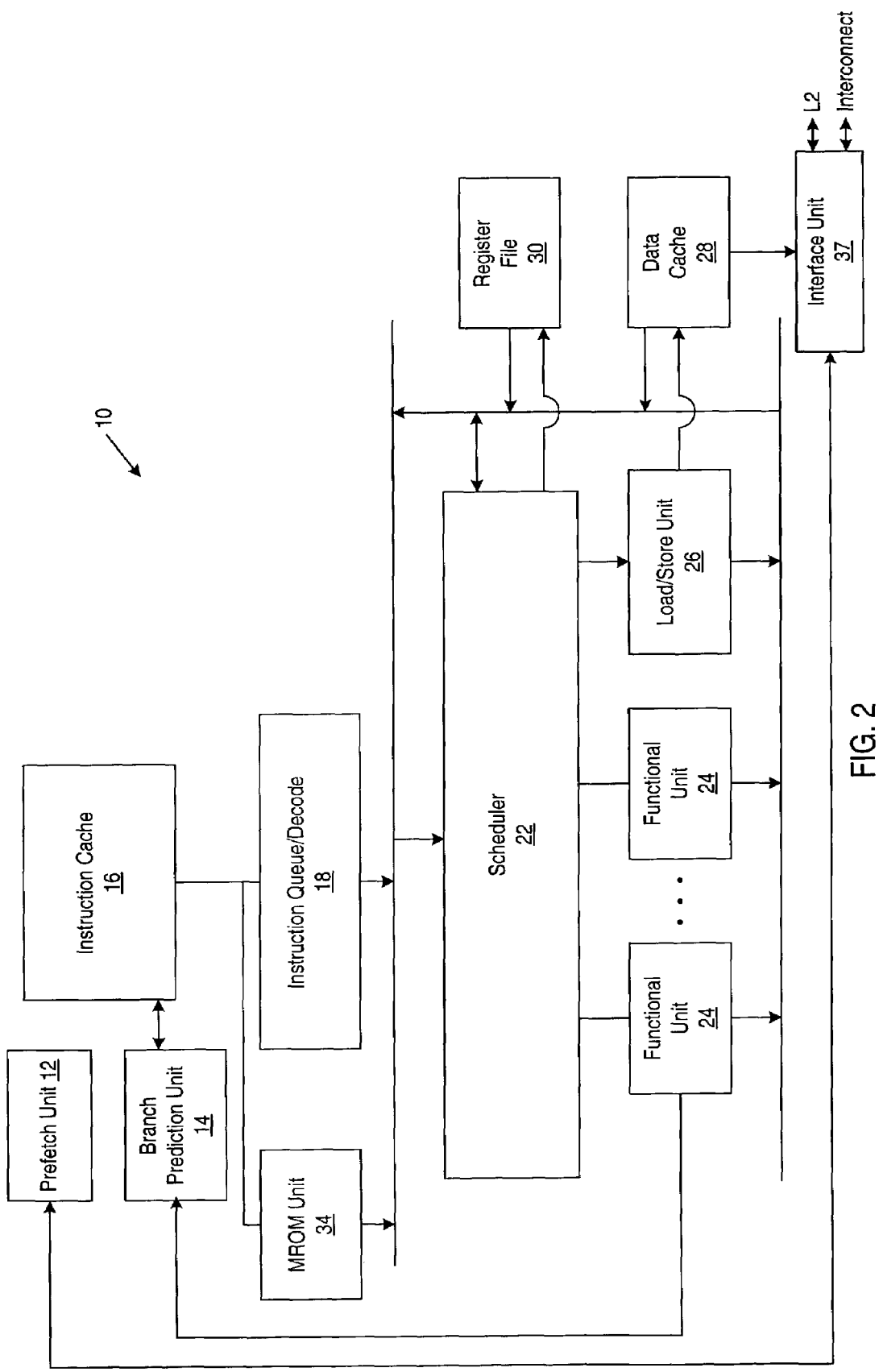
FIG. 2 is a block diagram of one embodiment of a processor including microcode entry point generation, according to one embodiment.

Turning now to FIG. 2, a block diagram of one embodiment of a processor 10 is shown. Other embodiments are possible and contemplated. As shown in FIG. 2, processor 10 may include a prefetch/predecode unit 12, a branch prediction unit 14, an instruction cache 16, an instruction queue/decode unit 18, a scheduler 22, a plurality of functional units 24, a load/store unit 26, a data cache 28, a register file 30, an microcode (MROM) unit 34, and a bus interface unit 37.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to scheduler 22 and functional units 24. Instruction cache 16 is further coupled to MROM unit 34 and instruction queue/decode unit 18. Instruction queue/decode unit 18 is in turn coupled to scheduler 22. Scheduler 22 is further coupled to respective execution functional units 24 and load/store unit 26. Additionally, instruction queue/decode unit 18 and scheduler 22 are coupled to register file 30. Functional units 24 are coupled to load/store unit 26, register file 30, and scheduler 22 as well. Data cache 28 is coupled to load/store unit 26 and to bus interface unit 37. Bus interface unit 37 is further coupled to an L2 interface to an L2 cache and a bus. Finally, MROM unit 34 is coupled scheduler 22.

Instruction cache 16 may be a high speed cache memory provided to store instructions. Instructions may be fetched from instruction cache 16 and dispatched to instruction queue/decode unit 18. For example, instruction cache 16 may be configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions may be stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. In some embodiments, as prefetch/predecode unit 12 transfers instructions to instruction cache 16, prefetch/predecode unit 12 may generates predecode bits for each byte of the instructions. The predecode bits may form tags indicative of the boundaries of each instruction. The predecode tags may also convey additional information such as whether a given instruction may be directly decoded or whether the instruction is executed by invoking a microcode procedure controlled by MROM unit 34. In one embodiment, instructions which may be directly decoded in instruction queue/decode unit 18 are referred to as "fast path" instructions. Other instructions may be MROM instructions. In one embodiment, the type of instruction may be determined by examining the predecode tag. Still further, prefetch/predecode unit 12 may be configured to detect branch instructions and to store branch prediction information corresponding to the branch instructions into branch prediction unit 14. Other embodiments may employ any suitable predecode scheme or no predecode at all.

In one embodiment, MROM (or complex) instructions are instructions which are determined to be too complex for decode by instruction queue/decode unit 18. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of decoded fast path instructions scheduler 22. In another embodiment, MROM unit 34 may dispatch fast path instructions to a decode portion of instruction queue/decode unit 18. The fast path (or microcode) instructions to implement an MROM instruction may be stored in a storage of MROM unit 34. For a particular MROM instruction, an MROM entry point generator locates the appropriate microcode instruction routine within the MROM storage. MROM entry points may be generated for sparse decoding, as discussed in regard to FIGS. 3–6 below.

Processor 10 may employ branch prediction in order to speculatively fetch instructions subsequent to conditional branch instructions. Branch prediction unit 14 is included to perform branch prediction operations. In one embodiment, branch prediction unit 14 employs a branch target buffer which caches branch target addresses and corresponding taken/not taken predictions cache line or cache line portion in instruction cache 16. Prefetch/predecode unit 12 may determines initial branch targets when a particular line is predecoded. Subsequent updates to the branch targets corresponding to a cache line may occur due to the execution of instructions within the cache line. Instruction cache 16 may provide an indication of the instruction address being fetched, so that branch prediction unit 14 may determine which branch target addresses to select for forming a branch prediction. Instruction queue/decode unit 18 and execution functional unit 24 may provide update information to branch prediction unit 14. Instruction queue/decode unit 18 may detect branch instructions which were not predicted by branch prediction unit 14. One of the functional units 24 executes the branch instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch may be discarded from the various units of processor 10. In an alternative configuration, branch prediction unit 14 may receive branch misprediction information from reordering logic in scheduler 22. A variety of suitable branch prediction algorithms may be employed by branch prediction unit 14.

Instructions fetched from instruction cache 16 are conveyed to instruction queue/decode unit 18. In one embodiment, as instructions are fetched from instruction cache 16, the corresponding predecode data may be scanned to provide information to instruction queue/decode unit 18 (and to MROM unit 34) regarding the instructions being fetched. Instruction queue/decode unit 18 may decode instructions and route register operand information register file 30 and scheduler 22.

Processor 10 may support out of order execution. The scheduler 22, or a reorder buffer, may keep track of the original program sequence for register read and write operations in order to implement register renaming, allow for speculative instruction execution and branch misprediction recovery, and facilitate precise exceptions. If a branch prediction is incorrect, the results of speculatively-executed instructions along the mispredicted path may be invalidated before they are committed to register file 30. Similarly, if a particular instruction causes an exception, instructions subsequent to the particular instruction may be discarded. In this manner, exceptions may be "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded.

Decoded instruction control values and immediate or displacement data are provided from instruction queue/decode unit 18 to scheduler 22. Scheduler 22 may include a separate scheduler portion for each execution unit 24 and load/store unit 26. Scheduler 22 may hold instructions until they are ready to be issued to execution functional units 24. Upon decode of a particular instruction, if a required operand is a register location, register address information may be routed to register file 30 simultaneously. If the instructions require one or more memory operations to be performed, scheduler 22 may issue the memory operations to load/store unit 26.

As noted earlier, scheduler 22 stores instructions until the instructions are executed by a corresponding execution unit 24. In one embodiment, when an instruction(s) is executed by an execution unit 24, the result(s) of that instruction is forwarded directly to scheduler 22 for any pending instruction that is waiting for that result (this technique is commonly referred to as "result forwarding"). An instruction may be selected for execution and passed to an execution unit 24 during the clock cycle that the associated result is forwarded. Scheduler 22 routes the forwarded result to the functional unit 24 in this case.

In one embodiment, each of the functional units 24 may be configured to perform integer arithmetic operations of addition and subtraction, as well as shifts, rotates, logical operations, and branch operations. The operations are performed in response to the control values decoded for a particular instruction by instruction queue/decode unit 18. It is noted that a floating point unit (not shown) may also be employed to accommodate floating point operations. The floating point unit may be operated as a coprocessor, receiving instructions from MROM unit 34 or scheduler 22 and subsequently communicating with scheduler 22 or a reorder buffer to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Results produced by execution units 24 are sent to register file if a register value is being updated, and to load/store unit 26 if the contents of a memory location are changed. Scheduler 22 maintains register renaming for physical register file 30. In other embodiments, a reorder buffer may be used to ensure that results are retired to register file 30 in the correct order.

Load/store unit 26 may provides an interface between execution unit 24 and data cache 28. Load/store unit 26 may also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the processor's address translation mechanism.

Data cache 28 may be a high speed cache memory provided to temporarily store data being transferred between load/store unit 26 and the main memory subsystem. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Interface unit 37 is configured to communicate between processor 10 and other components in a computer system via a bus or point-to-point interface. Any suitable interconnect structure may be used including packet-based, unidirectional or bi-directional links, etc. An optional L2 cache interface may be employed as well for interfacing to a level two cache, which may be internal or external to the processor.

Figure 3:
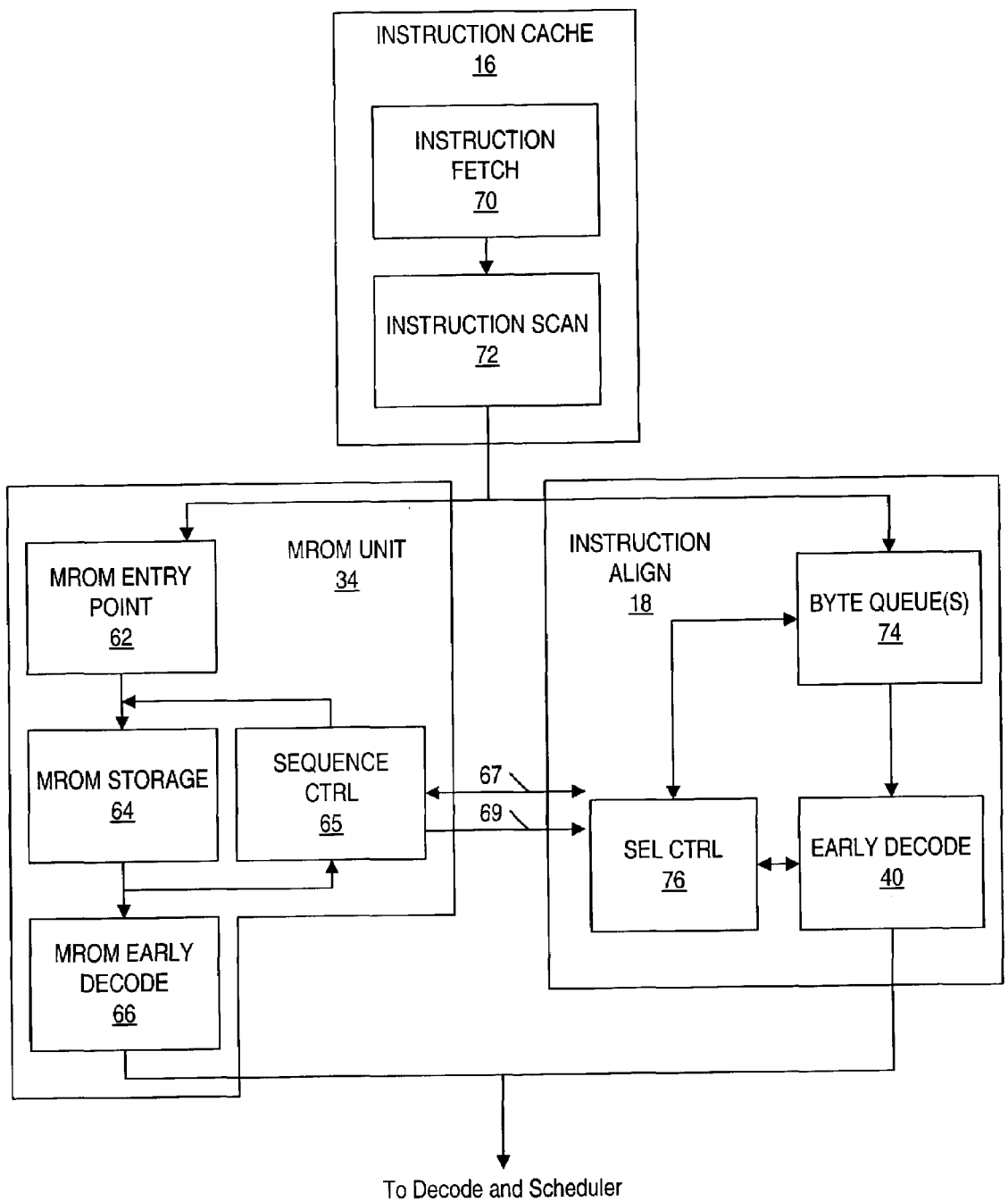
FIG. 3 illustrates portions of a processor including a microcode unit, according to one embodiment.

Turning now to FIG. 3, a diagram depicting portions of instruction cache 16, instruction queue/decode unit 18, and MROM unit 34 is shown. Embodiments of microprocessor 10 may employ other elements in addition to those shown in FIG. 3. Instruction cache 16 includes instruction fetch 70 and instruction scan 72. MROM unit 34 includes MROM entry point 62, MROM storage 64, sequence control 65, and MROM early decode 66. Instruction queue/decode unit 18 includes instruction queue(s) 74, selection control unit 76, and early decode 40.

Instruction fetch 70 fetches instructions from instruction cache storage (not shown) using addresses provided by branch prediction unit 14. Instruction fetch 70 conveys the fetched instructions to instruction scan unit 72. Generally speaking, an instruction fetch unit is a device that fetches instruction to be executed by a microprocessor. Instruction scan unit 72 conveys the instructions to instruction queue(s) 74, and detects MROM instructions. MROM instructions detected by instruction scan unit 72 are conveyed to MROM entry point 62. In one embodiment, one MROM instruction per clock cycle is accepted by MROM unit 34. Therefore, if a second MROM instruction is detected within a set of instruction bytes being scanned during a particular clock cycle, instruction blocks including the second MROM instruction and subsequent instructions in the program order are stalled until a subsequent clock cycle.

The flow of instructions through MROM unit 34 is discussed next. MROM entry point 62 provides the address of the first microcode instruction in MROM storage 64 that corresponds to an MROM instruction received from instruction scan unit 72. The manner in which MROM entry point 62 provides the MROM address is discussed in detail below. The address provided by MROM entry point 62 is the location of the first microcode line that stores the microcode instructions that effectuate the desired operation of the MROM instruction. Microcode instructions, like fastpath instructions, are directly decodable. The number of microcode instructions required to implement an MROM instruction varies from MROM instruction to MROM instruction. Complex MROM instructions may require many microcode instructions, and relatively simple MROM instructions may be implemented by two microcode instructions. The microcode instructions that implement an MROM instruction may include branch instructions. For example, in one embodiment the microcode instructions to implement the MROM instruction MOVS are:

|       | LDDF           | ;load direction flag to latch in FU        |
|-------|----------------|--------------------------------------------|
|       | OR    ecx,ecx  | ;test if ecx is zero                       |
|       | JZ    end_loop | ;terminate string moves if ecx is zero     |
| loop: | MOVFM+tmp0, [esi] | ;move to tmp0 data from source and inc/dec esi |
|       | MOVTM+[edi], tmp0 | ;move the data to destination and inc/dec edi |
|       | DECXJNZloop    | ;dec ecx and repeat until zero             |
| end_loop: | EXIT       |                                            |

MROM storage 64 includes a storage device capable of storing microcode instructions. In one embodiment, MROM storage 64 includes a read-only memory (ROM). In other embodiments, other storage devices may be used to implement MROM storage 64, such as RAM, SRAM, Flash memory, etc. MROM storage 64 uses the entry point address provided by MROM entry point 62 to access the first microcode instruction line. MROM storage 64 includes a decoder to decode the entry point address to select an entry of the MROM storage device. As discussed in more detail below, the decoder may be configured to sparsely decode entry point addresses wider than needed to address all the entries of the MROM storage. By sparsely decoding a larger-than-needed address range, the generation of entry point addresses by MROM entry point 62 may be simplified.

In one embodiment, MROM storage 64 stores multiple microcode instructions in each microcode line of MROM storage 64. In one specific embodiment, each microcode line contains a number of microcode instructions equal to the number of functional units in the microprocessor. For example, in an embodiment in which three functional units 24 are employed, each microcode line may include three microcode instructions. Because the number of microcode instructions required to implement an MROM instruction may exceed the number of microcode instructions in one line of MROM storage 64, sequence control 65 determines the location of the next line of microcode to be accessed. The next line of microcode to execute may be the subsequent line in MROM storage 64 in incremental order. If, however, a microcode line in MROM storage 64 includes a "taken" branch instruction, sequence control unit 65 detects or calculates the branch address and provides that address as the next line to access from MROM storage 64. Some branches may depend on the state of a flag register, such as the EFLAGs register. Thus sequence control 65 may receive the necessary flag information. In addition to specifying branch addresses, sequence control 65 also detects the last line of the microcode sequence.

Each line of microcode accessed from MROM storage 64 is dispatched to MROM early decode 66. MROM early decode 66 may perform some formatting and/or decoding of the instructions similar to the formatting of early decode unit 40 for fastpath instructions. The formatted instructions are conveyed to a decode unit either in scheduler 22 or in a later stage of instruction queue/decode unit 18. In other embodiments, no early decode may be needed and microcode instructions may be sent from MROM storage 64 to a decode unit in scheduler 22 or in a later stage of instruction queue/decode unit 18.

Fastpath instructions from instruction queue/decode unit 18 may be stalled while MROM microcode instructions that implement an MROM instruction are issued by MROM unit 34. Synchronization is provided between MROM storage 64 and instruction queue(s) 74. Because both MROM storage 64 and instruction queue(s) receive instructions in program order it is sufficient to synchronize instructions via synchronization signal 67.

As discussed above, sequence control 65 provides the address of the next microcode line to access from MROM storage 64. In one embodiment, to generate the next address, each microcode line has a microcode sequence control field, or simply "sequence control field", associated with it. Generally speaking, a sequence control field is a field that contains data used to control the access of data within an MROM storage device. In one embodiment, this field contains data indicating whether the line indicates the end of the microcode instruction routine, whether the microcode line contains a jump, call or branch, conditions for conditional microbranches, and other information necessary for sequence control of MROM storage 64.

Sequence control 65 may also detect the end of a microcode sequence that implements an MROM instruction. Upon detecting the end of a microcode sequence, sequence control 65 may select the entry point generated by MROM entry point 62 as the next address from which to access a microcode line following the subsequent line in order to begin a new microcode sequence. In addition to indicating the last microcode line of an MROM instruction, the sequence control field may indicate how many microcode instructions are in the last microcode line. The number of microcode instructions in the last microcode line may be conveyed to selection control 76 via an early exit signal line 69. Selection control 76 can use the information from the early exit signal to pack additional fastpath instructions at the end of the microcode instruction line. In this manner, instructions are issued to each functional unit and dispatch bandwidth is not wasted.

Figure 4:
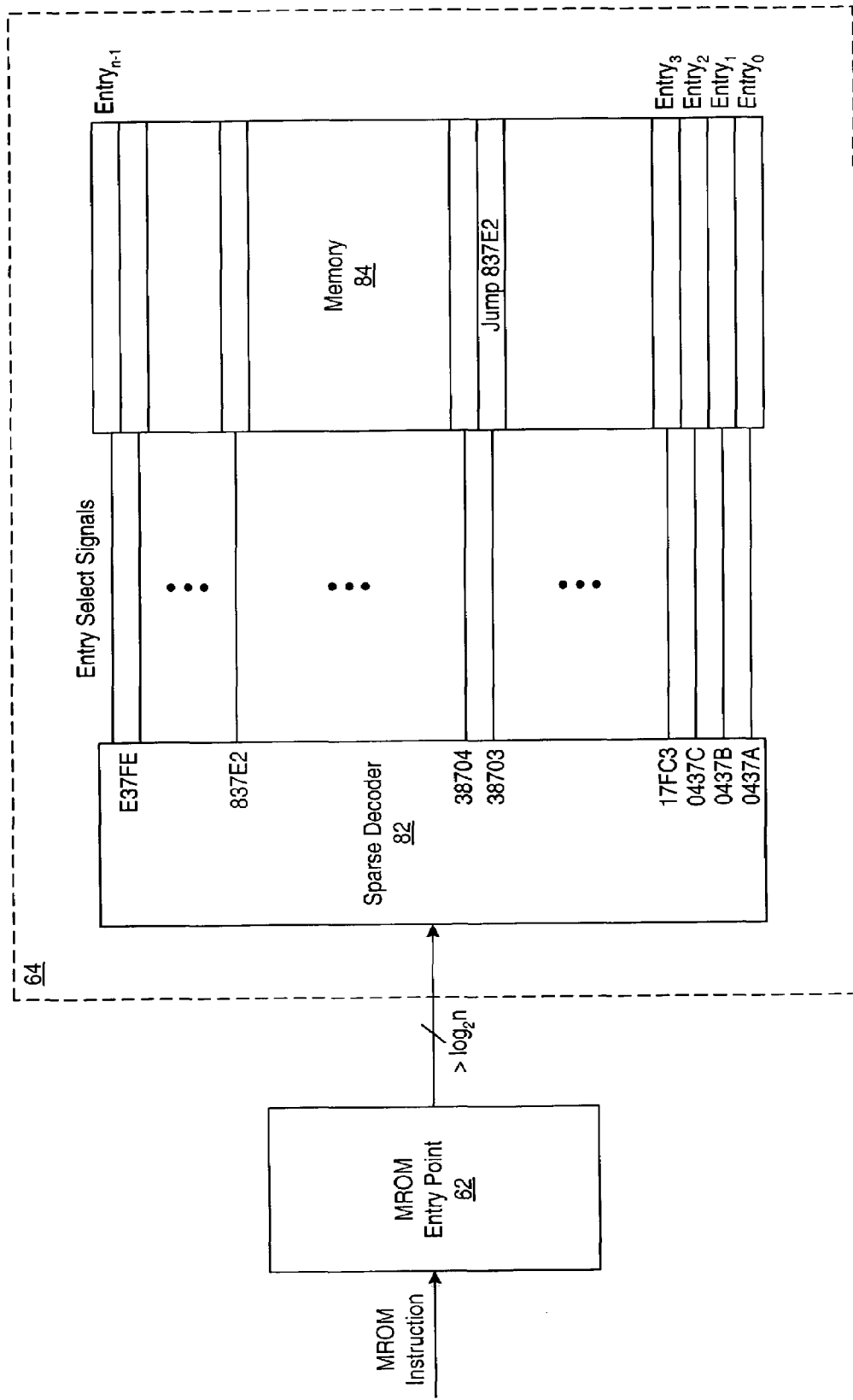
FIG. 4 illustrates portions of a microcode unit including an entry point mechanism and microcode storage decode, according to one embodiment.

Turning now to FIG. 4, portions of MROM unit 34 are shown to illustrate an efficient MROM entry point mechanism. Other details of MROM unit 34 are not illustrated to simplify discussion of MROM entry point generation. MROM storage 64 includes a memory 84 having n memory locations $entry_0$–$entry_{n-1}$. MROM storage 64 also includes a decoder 82 couple to memory 84. Decoder 82 receives an entry point address from MROM entry point unit 62 and decodes the entry point address to select one of the entries of memory 84. MROM entry point 62 is configured to provide an entry point address that includes more bits than are necessary to encode the number of memory locations in memory 84. For example, for a binary encoding, the number of bits required to encode n memory locations is $\log_2 n$ rounded up to the next whole integer. Thus, for a memory 84 having 4K entries the number of bits to encode the 4K entries is: $\log_2 4096=12$ bits. MROM entry point 62 is configured to map or translate MROM instructions into entry point addresses having more bits than are necessary for the size of the MROM memory 84. By mapping or translating the MROM instructions to a wider entry point address (i.e. an address having more bits than necessary to encode the size of memory 84), the mapping or translation logic in MROM entry point 62 may be simplified. Thus, in the example where memory 84 is a 4K ROM, the entry point addresses provided by MROM entry point 62 are more than 12 bits wide.

The decoder 82 for memory 84 is configured to decode the wide entry point address received from MROM entry point 62 to select one of the entries in memory 84. Since the wide entry point address received from MROM entry point 62 contains more bits than necessary to encode the size of memory 84, decoder 82 does not need to fully decode every possible bit combination corresponding to the size of the entry point address. Instead, decoder 82 may be a sparse decoder that decodes a subset of the full entry point address range to particular locations of memory 84. For example, assume memory 84 is a 4K memory and assume MROM entry point 62 provides a 20-bit wide entry point address to sparse decoder 82. The 20-bit entry point address has $2^{20}=1M$ different bit combinations. However, sparse decoder 82 may be configured to only decode 4K of the 1M different combinations since memory 84 has only 4K entries. In some embodiments the bit combinations of the entry point address not decoded by sparse decoder 82 may be treated as don't-cares to simplify the implementation of sparse decoder 82.

Microcode instructions for microcode routines are stored in the entries of memory 84 to implement MROM instructions. For each MROM instruction, MROM entry point unit 62 provides a corresponding MROM address to MROM storage 64. The MROM address for the MROM instruction is decoded by sparse decoder 82 to select an entry in memory 84, which contains the first line of microcode instructions of a microcode sequence to implement the corresponding MROM instruction. For example, as illustrated in FIG. 4, one MROM instruction may be mapped by entry point 62 to an MROM address of 0x0437A which is decoded by sparse decoder 82 to select entry$_0$ of memory 84. If more than one line of microcode is required to implement the MROM instruction the additional lines of microcode may be stored in other entries in memory 84. These entries may be addressed by the next sequential addresses from the MROM entry point address for the MROM instruction. The address sequencing may be controlled by sequence control unit 65 (FIG. 3). For example, for the MROM instruction having an MROM entry point address of 0x0437A, the corresponding microcode sequence may continue in entry$_1$ and entry$_2$ addressed through decoder 82 at 0x0437B and 0x0437C respectively. Entry$_2$ of memory 84 may be the last line of microcode instructions for that microcode sequence. The next entry in memory 84, entry$_3$, may be addressed by a different MROM entry point address corresponding to a different MROM instruction. For example, entry$_3$ may be addressed by a non-sequential address (e.g. 0x17FC3) since the MROM entry point addresses contain more bits than needed to address all of the entries in memory 84.

As mentioned above, the MROM entry point address generation performed by MROM entry point 62 may be simplified by mapping or translating MROM instructions received from the instruction cache to an MROM entry point address having more bits than necessary to address all the entries of memory 84. Depending on the implementation of MROM entry point 62, some MROM entry point addresses may be adjacent or close together in the MROM entry point address range so that few or none sequential MROM entry point addresses exist between two different MROM entry points. For example, as illustrated in FIG. 4, one MROM instruction may be mapped by MROM entry point 62 to MROM entry point address 0x38703 and another MROM instruction may be mapped to MROM entry point address 0x38704. If the microcode sequence corresponding to the MROM instruction mapped to entry point address 0x387D3 require more than one entry to store the necessary microcode instructions, the additional needed entries in memory 84 cannot be addressed by sequential MROM addresses since the next sequential address is the entry point for a different MROM instruction. Thus, for some MROM entry points, if enough sequential MROM addresses are not free, a microcode instruction may be included in the microcode sequence to jump to another address in the MROM address range for which enough sequential addresses are open to address enough entries in memory 84 to complete the microcode routine.

Figure 5:
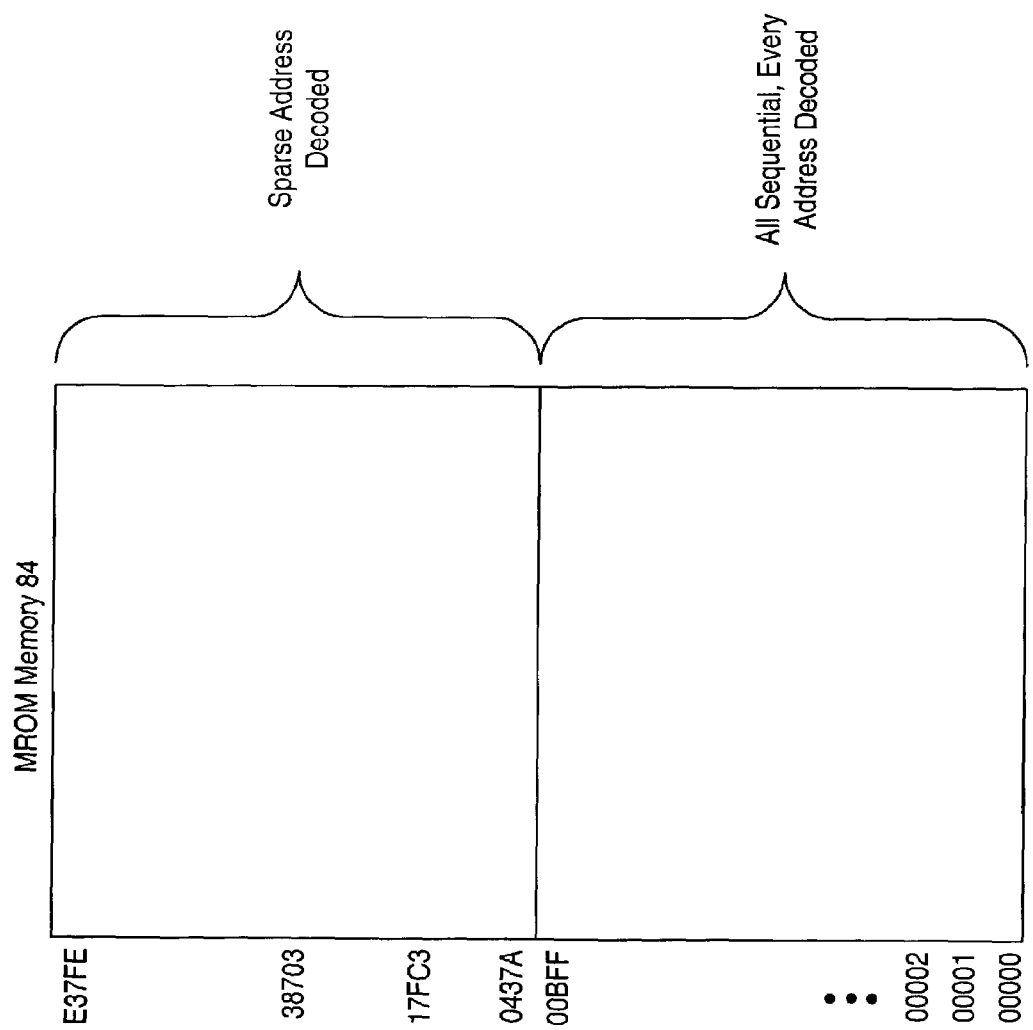
FIG. 5 illustrates a microcode storage in which the bottom of the microcode storage address range is completely (i.e. sequentially) decoded, the top of the microcode storage address range is sparsely addressed.

In one embodiment, memory 84 may include one section that is addressed by completely sequential addresses and a second section in which all the entries are not addressed sequentially. FIG. 5 shows an embodiment of memory 84 in which the bottom of the MROM address range is completely (i.e. sequentially) decoded for the first 3K entries. However, for a portion of MROM memory 84 above the first 3K entries the entries are sparsely addressed in the MROM address range so that the MROM entry point generation may be simplified. A portion of decoder 82 decoding addresses for the bottom sequential 3K portion of memory 84 may be implemented as a traditional full decoder which decodes every address from 0x00000 to 0x00BFF. However, decoder 82 is a sparse decoder for the entries selected by addresses in the MROM address range above 0x00BFF. Some or all of the MROM instructions may be mapped to an MROM entry point address in the sparsely addressed portion of MROM memory 84 in order to simplify the MROM entry point address mapping. As discussed above, the MROM entry point address mapping may be simplified because more bits than necessary to encode the number of entries in memory 84 are used to address memory 84.

The entry point for an MROM instruction may be mapped to an address in the sparsely decoded section of memory 84. If the size of the microcode routine to implement that MROM instruction is such that multiple entries are needed to store the number of microcode instructions, the entry addressed by the MROM entry point address may include a microcode instruction to jump to the sequential portion of memory 84 (e.g. a jump to an address in the range 0x00000 to 0x00BFF) so that the rest of the microcode entries may be sequentially addressed to simplify the issuance of the microcode instructions from memory 84 as the microcode routine is being executed. Alternatively, if enough sequential addresses may be decoded in the sparsely address region of memory 84 without running into another entry point address, the microcode routine may be completely or partially stored in the sparsely addressed region of memory 84. The completely sequential portion of memory 84 may also provide a convenient place to locate microcode routines other than those corresponding to MROM instructions. For example, microcode routines for handling interrupts and exceptions may be located in the sequential portion of memory 84 (e.g. in the 0 to BFF range).

As mentioned above, MROM entry point 62 may be simplified by using a wider MROM address than is necessary to fully encode the number of entries in MROM memory 84. In one embodiment the MROM entry point address may be generated by simply taking bits directly from the MROM instruction encoding as the MROM entry point address. For example, referring back to FIG. 1A, certain bits from the prefix, opcode, and MOD R/M bytes of MROM instructions may be directly used as the MROM entry point address. In such an embodiment, MROM entry point 62 may be configured with almost no mapping or translation logic whatsoever. In other embodiments it may be desirable to perform at least a minimal level of mapping or translation of the MROM instruction encoding to the MROM entry point addresses. For example, depending upon the encoding of the MROM instructions it may be that a large number of bits from the MROM instruction encodings are required to uniquely identify each MROM instruction. If all of these bits were used for the MROM entry point address the input to decoder 82 may be wider than desirable. Thus, MROM entry point 62 may perform some mapping or translation from the MROM instruction encodings to the MROM entry point addresses so that the input to decoder 82 is narrower (but still wider than necessary to fully address memory 84) or so that decoder 82 is otherwise simplified. It may also be desirable to perform at least some mapping or translation of MROM instructions to entry point addresses beyond a simple bit to bit correspondence in order to provide larger sequential address spaces between entry points in memory 84.

Note that various memory sizes, address ranges, specific addresses, etc. have been used by way of example herein. These examples are merely for illustrative purposes and are not to be seen as limiting. The size of the MROM memory, the address ranges, and particular entry point addresses to which MROM instructions are mapped, etc. may vary for different embodiments.

Figure 6:
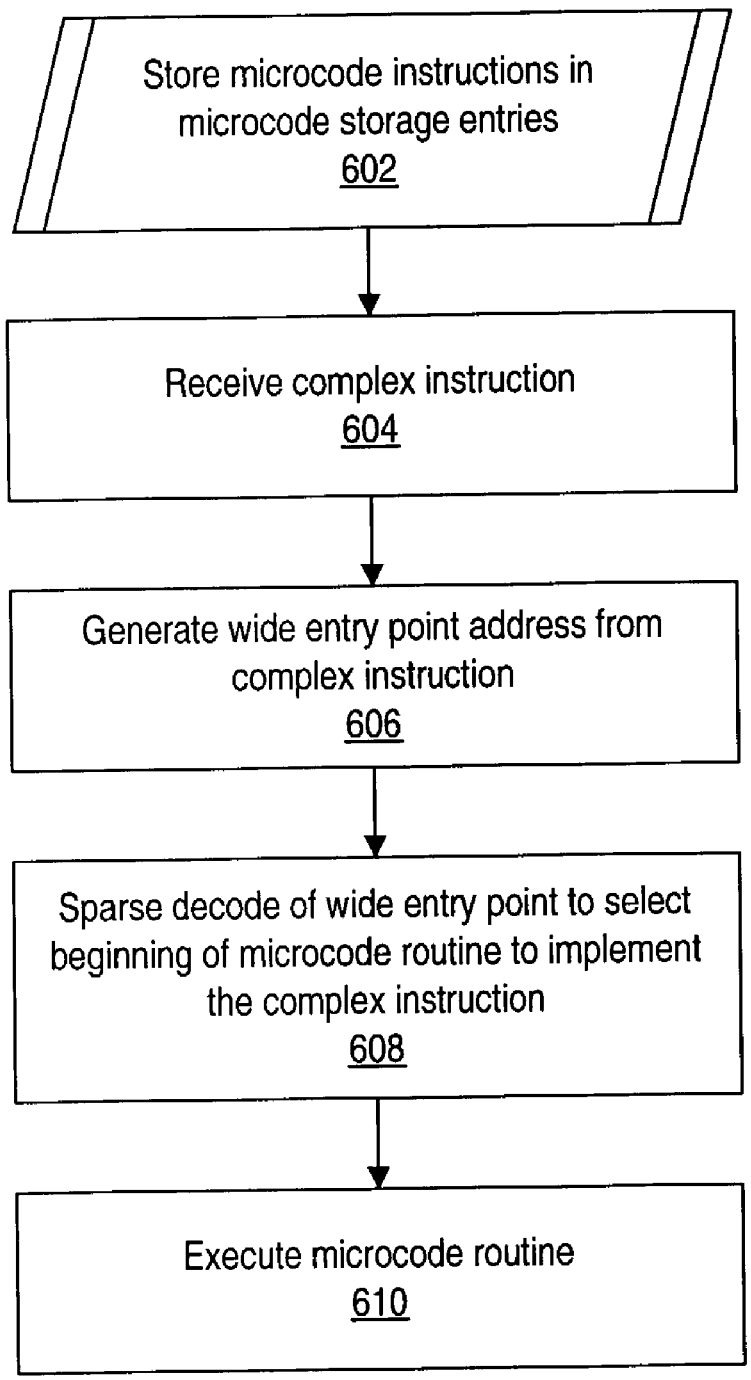
FIG. 6 is a flow chart illustrating a method for efficient entry point generation for a microcode storage in a processor.

Turning now to FIG. 6, a flow chart illustrates a method for efficient entry point generation for a microcode storage in a processor. Microcode instructions are stored in a plurality of entries of a microcode storage, as indicated at 602. The microcode instructions may include routines for implementing complex processor instructions. When a complex instruction is reached in the instruction stream in a processor, as indicated at 604, an entry point address may be generated from the complex instruction, as indicated at 606. The microcode entry point addresses may be a "wide" address having more bits than needed to encode all of the microcode storage entries. For example, the microcode storage may have n entries, and the bit-width of the microcode entry point addresses may be greater than $\log_2 n$ rounded up to the next integer. In one embodiment, generating a microcode entry point address from a complex instruction may include providing portions of the complex instruction encoding as the microcode entry point address.

The microcode entry point address may be decoded, as indicated at 608, to select one of the microcode storage entries storing the beginning of a microcode routine to implement the corresponding complex instruction. The entry point address may be decoded to a sparsely addressed section of the microcode memory in which not all of the entries are sequentially addressed. The located microcode routine may be executed to implement the complex instruction, as indicated at 610.

In one embodiment, the microcode storage may include a sequentially addressed section and a sparsely addressed section. The microcode entry point address may correspond to the sparsely addressed section. A microcode instruction indicating a jump to a microcode address in the sequentially addressed section may be stored in one of the entries of the microcode storage selected by the microcode entry point address. Thus, execution of a microcode routine may include jumping to the sequentially decoded section of the microcode storage and incrementing the microcode storage address to complete the routine.

Figure 7:
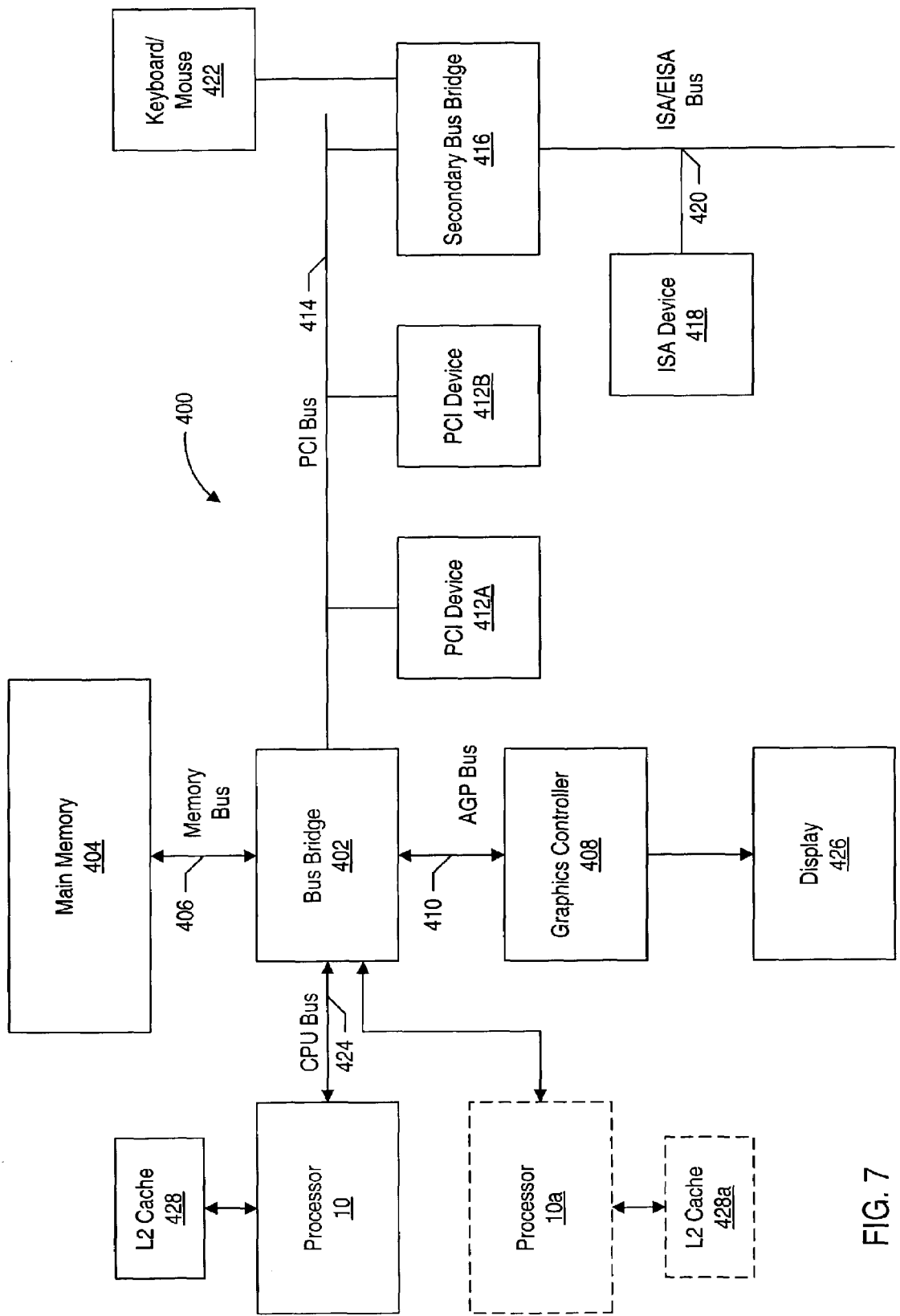
FIG. 7 is a block diagram of a computer system including a processor with efficient microcode entry point generation, according to one embodiment.

FIG. 7 shows a block diagram of one embodiment of a computer system 400 that includes a microprocessor 10, such as the processor described above, coupled to a variety of system components through a bus bridge 402. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 10 is coupled to bus bridge 402 through a microprocessor bus 424 and to an optional L2 cache 428. In some embodiments, the microprocessor 10 may include an integrated L1 cache (not shown).

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus. Bus bridge 402 may include a memory controller 100 as described above in some embodiments. In other embodiments, certain functionality of bus bridge 402, including that provided by memory controller 100, may be integrated into microprocessors 10 and 10a.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to microprocessor bus 424 between microprocessor 10 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 10. It is noted that L2 cache 428 may be separate from microprocessor 10, integrated into a cartridge (e.g., slot 1 or slot A) with microprocessor 10, or even integrated onto a semiconductor substrate with microprocessor 10.

Main memory 404 is a memory in which application programs are stored and from which microprocessor 10 primarily executes. A suitable main memory 404 includes DRAM (Dynamic Random Access Memory). For example, a plurality of banks of SDRAM (Synchronous DRAM) or Rambus DRAM (RDRAM) may be suitable. Main memory may store program instructions executed by the processor 10.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 10a shown as an optional component of computer system 400). Microprocessor 10a may be similar to microprocessor 10. More particularly, microprocessor 10a may be an identical copy of microprocessor 10. Microprocessor 10a may be connected to bus bridge 402 via an independent bus (as shown in FIG. 7) or may share microprocessor bus 224 with microprocessor 10. Furthermore, microprocessor 10a may be coupled to an optional L2 cache 428a similar to L2 cache 428.

Figure 8:
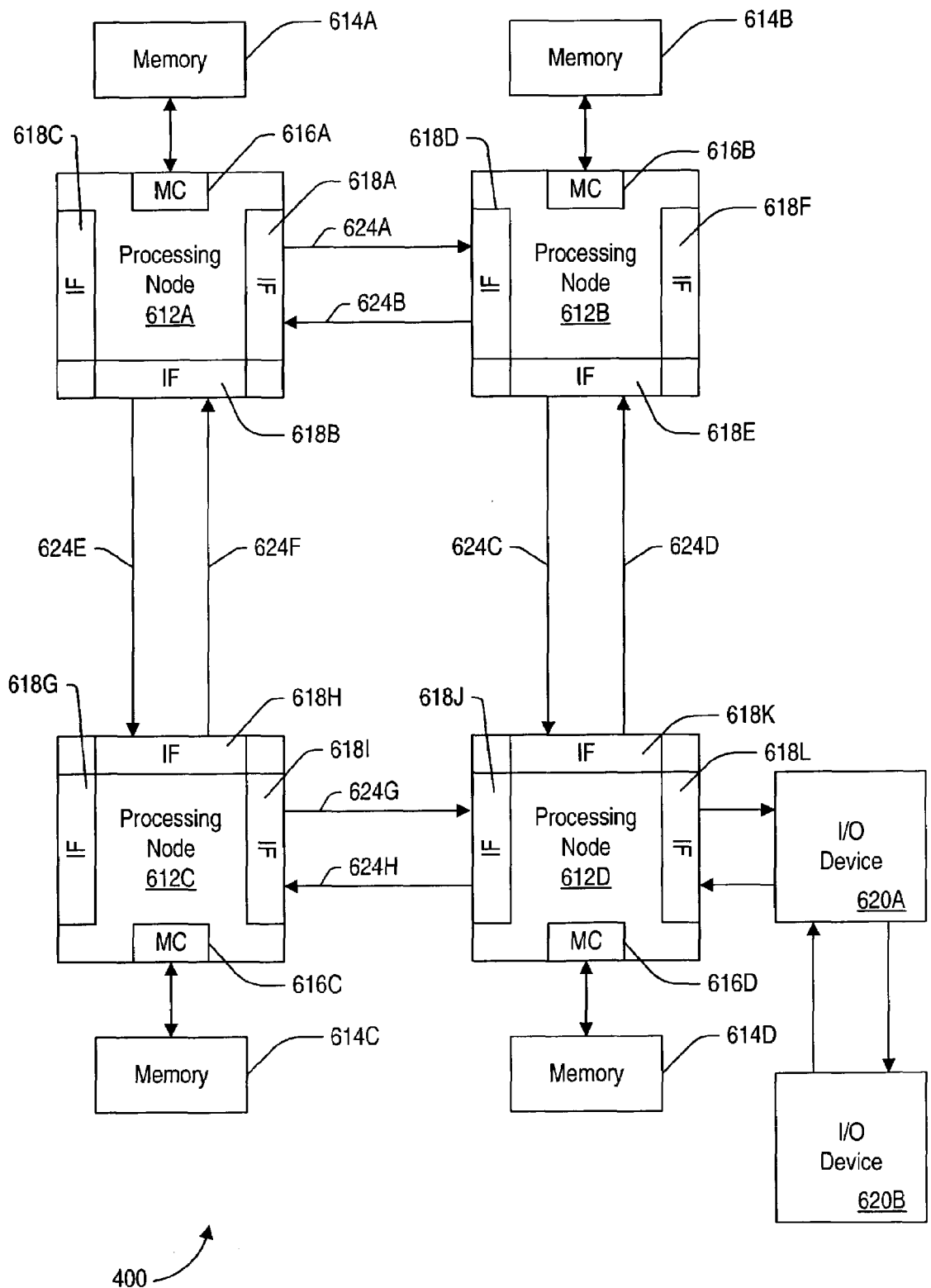
FIG. 8 is a block diagram of a computer system including a processor with efficient microcode entry point generation, according to another embodiment.

Turning now to FIG. 8, another embodiment of a computer system 400 that may include a processor 10 as described above is shown. Other embodiments are possible and contemplated. In the embodiment of FIG. 8, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes, as illustrated in FIG. 8. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C, as shown in FIG. 8. Any suitable routing algorithm may be used. Other embodiments of computer system 400 may include more or fewer processing nodes then the embodiment shown in FIG. 8.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A–612D may include one or more copies of microprocessor 10 (as described above). Interface unit 37 may includes the interface logic 618 within the node, as well as the memory controller 616.

Memories 614A–614D may include any suitable memory devices. For example, a memory 614A–614D may include one or more RAMBUS DRAMs (RDRAMs), synchronous DRAMs (SDRAMs), static RAM, etc. Memories 614 may include program instructions executable by the processing nodes 612. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A microcode instruction unit, comprising:
   a microcode memory including a plurality of entries configured to store microcode instructions;
   a decoder coupled to said microcode memory and configured to sequentially decode microcode addresses within a first portion of a microcode address space to select corresponding entries of said microcode memory, wherein said decoder is further configured to sparsely decode microcode addresses within a second portion of said microcode address space to select corresponding entries of said microcode memory, wherein said first and second portions of said microcode address space do not overlap, and wherein the number of unique microcode addresses within said microcode address space is larger than the number of entries of said microcode memory; and
   a microcode entry point unit configured to receive complex instructions and provide a respective microcode entry point address to said decoder for each complex instruction, wherein respective microcode entry point addresses corresponding to a first and a second complex instruction fall within said sparsely-decoded second portion of said microcode address space;
   wherein one or more microcode instructions included within an entry corresponding to the respective microcode entry point address of said first complex instruction are sufficient to implement said first complex instruction without reference to another entry within said microcode memory;
   wherein an entry corresponding to the respective microcode entry point address of said second complex instruction includes a jump microcode instruction configured to reference an entry within said sequentially-decoded first portion of said microcode address space.

2. The microcode instruction unit as recited in claim 1, wherein respective microcode entry point addresses corresponding to each of said complex instructions fall within said sparsely-decoded second portion of said microcode address space.

3. The microcode instruction unit as recited in claim 1, wherein said microcode address space includes only said sequentially-decoded first portion and said sparsely-decoded second portion.

4. The microcode instruction unit as recited in claim 1, wherein said microcode memory includes N entries, and wherein a bit-width of each of said respective microcode entry point addresses is greater than $\log_2 N$ rounded up to the next integer.

5. The microcode instruction unit as recited in claim 1, wherein said microcode memory additionally includes a respective sequence control field corresponding to each of said plurality of entries, wherein said respective sequence control fields are configured to configured to indicate whether a corresponding entry includes a jump microcode instruction.

6. The microcode instruction unit as recited in claim 1, wherein a portion of a respective microcode entry point address corresponding to a given complex instruction includes an untranslated portion of said given complex instruction's encoding.

7. The microcode instruction unit as recited in claim 1, wherein said microcode entry point unit is configured to translate a portion of a given complex instruction's encoding to provide a portion of a respective microcode entry point address corresponding to said given complex instruction.

8. A processor, comprising:
   a cache unit configured to store instructions to be executed by the processor;
   a microcode unit configured to receive complex instructions from said cache, wherein said microcode unit comprises:
      a microcode memory including a plurality of entries configured to store microcode instructions;
      a decoder coupled to said microcode memory and configured to sequentially decode microcode addresses within a first portion of a microcode address space to select corresponding entries of said microcode memory, wherein said decoder is further configured to sparsely decode microcode addresses within a second portion of said microcode address space to select corresponding entries of said microcode memory, wherein said first and second portions of said microcode address space do not overlap, and wherein the number of unique microcode addresses within said microcode address space is larger than the number of entries of said microcode memory; and
      a microcode entry point unit configured to receive complex instructions and provide a respective microcode entry point address to said decoder for each complex instruction, wherein respective microcode entry point addresses corresponding to a first and a second complex instruction fall within said sparsely-decoded second portion of said microcode address space;
      wherein one or more microcode instructions included within an entry corresponding to the respective microcode entry point address of said first complex instruction are sufficient to implement said first complex instruction without reference to another entry within said microcode memory;
      wherein an entry corresponding to the respective microcode entry point address of said second complex instruction includes a jump microcode instruction configured to reference an entry within said sequentially-decoded first portion of said microcode address space; and one or more functional units configured to execute microcode instruction routines from said microcode unit to implement the complex instructions.

9. The processor as recited in claim 8, wherein respective microcode entry point addresses corresponding to each of said complex instructions fall within said sparsely-decoded second portion of said microcode address space.

10. The processor as recited in claim 8, wherein said microcode address space includes only said sequentially-decoded first portion and said sparsely-decoded second portion.

11. The processor as recited in claim 8, wherein said microcode memory includes N entries, and wherein a bit-width of each of said respective microcode entry point addresses is greater than $\log_2 N$ rounded up to the next integer.

12. The processor as recited in claim 8, wherein said microcode memory additionally includes a respective sequence control field corresponding to each of said plurality of entries, wherein said respective sequence control fields are configured to configured to indicate whether a corresponding entry includes a jump microcode instruction.

13. The processor as recited in claim 8, wherein a portion of a respective microcode entry point address corresponding to a given complex instruction includes an untranslated portion of said given complex instruction's encoding.

14. The processor as recited in claim 8, wherein said microcode entry point unit is configured to translate a portion of a given complex instruction's encoding to provide a portion of a respective microcode entry point address corresponding to said given complex instruction.

15. A method, comprising:
storing microcode instructions in a plurality of entries of a microcode memory;
receiving complex instructions and generating respective microcode entry point addresses within a microcode address space for each complex instruction, wherein the number of unique addresses within said microcode address space is larger than the number of entries of said microcode memory;
sequentially decoding microcode addresses within a first portion of a microcode address space to select corresponding entries of said microcode memory; and
sparsely decoding microcode addresses within a second portion of said microcode address space to select corresponding entries of said microcode memory wherein said first and second portions of said microcode address space do not overlap;
wherein respective microcode entry point addresses corresponding to a first and a second complex instruction fall within said sparsely-decoded second portion of said microcode address space;
wherein one or more microcode instructions included within an entry corresponding to the respective microcode entry point address of said first complex instruction are sufficient to implement said first complex instruction without reference to another entry within said microcode memory;
wherein an entry corresponding to the respective microcode entry point address of said second complex instruction includes a jump microcode instruction configured to reference an entry within said sequentially-decoded first portion of said microcode address space.

16. The method as recited in claim 15, wherein respective microcode entry point addresses corresponding to each of said complex instructions fall within said sparsely-decoded second portion of said microcode address space.

17. The method as recited in claim 15, wherein said microcode address space includes only said sequentially-decoded first portion and said sparsely-decoded second portion.

18. The method as recited in claim 15, wherein said microcode memory includes N entries, and wherein a bit-width of each of said respective microcode entry point addresses is greater than $\log_2 N$ rounded up to the next integer.

19. The method as recited in claim 15, wherein said microcode memory additionally includes a respective sequence control field corresponding to each of said plurality of entries, wherein said respective sequence control fields are configured to configured to indicate whether a corresponding entry includes a jump microcode instruction.

20. The method as recited in claim 15, wherein a portion of a respective microcode entry point address corresponding to a given complex instruction includes an untranslated portion of said given complex instruction's encoding.

21. The method as recited in claim 15, wherein generating a respective microcode entry point address corresponding to a given complex instruction includes translating a portion of said given complex instruction's encoding.

* * * * *